(12) United States Patent
Furuya

(10) Patent No.: US 9,299,016 B2
(45) Date of Patent: Mar. 29, 2016

(54) MISREGISTRATION CORRECTING METHOD AND APPARATUS FOR USE IN IMAGE PROCESSING APPARATUS

(75) Inventor: Tomoyuki Furuya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 615 days.

(21) Appl. No.: 13/165,722

(22) Filed: Jun. 21, 2011

(65) Prior Publication Data

US 2011/0317185 A1 Dec. 29, 2011

(30) Foreign Application Priority Data

Jun. 28, 2010 (JP) .................................. 2010-146575

(51) Int. Cl.
 G06F 15/00 (2006.01)
 G06K 15/02 (2006.01)
 H04N 1/58 (2006.01)
(52) U.S. Cl.
 CPC .............. *G06K 15/1826* (2013.01); *H04N 1/58* (2013.01)
(58) Field of Classification Search
 CPC ....... H04N 1/58; G06K 1/00; G06K 15/1825; G06K 15/1826
 USPC .......................................................... 358/1.9
 See application file for complete search history.

(56) References Cited

U.S. PATENT DOCUMENTS

| 5,313,570 | A | 5/1994 | Dermer et al. |
| 5,386,483 | A | 1/1995 | Shibazaki ........................ 382/22 |
| 7,859,713 | B2 | 12/2010 | Furuya ............................ 358/1.3 |
| 2002/0141003 | A1* | 10/2002 | Chang et al. .................. 358/518 |
| 2005/0012946 | A1* | 1/2005 | Wilson ............................ 358/1.9 |
| 2008/0007752 | A1 | 1/2008 | Gandhi et al. |
| 2009/0284771 | A1* | 11/2009 | Yamazaki ...................... 358/1.9 |
| 2010/0079817 | A1* | 4/2010 | Guarnieri ...................... 358/3.24 |

FOREIGN PATENT DOCUMENTS

| JP | 07143353 A | 6/1995 |
| JP | 2639518 | 8/1997 |

* cited by examiner

*Primary Examiner* — Marivelisse Santiago Cordero
*Assistant Examiner* — Kevin Ky
(74) *Attorney, Agent, or Firm* — Fitzpatrick, Cella, Harper & Scinto

(57) ABSTRACT

A misregistration correcting apparatus form an edge list showing information of edges of one scan line from stored drawing objects, updates the formed edge list, and converts the formed edge list into a bit map of one scan line. The updating comprises a first edge list updating that updates the formed edge list on the basis of setting information of a trapping based on characteristics of a printing apparatus and an edge list of a one-line preceding line of the one scan line, and a second edge list updating that updates the edge list on the basis of the trapping setting information and a span showing an outline of the drawing object on the edge list.

8 Claims, 12 Drawing Sheets

FIG. 4

```
<Trapping Setting>
    <Feature name="width Point">
        <Option value="0.25"/>
    </Feature>
    <Feature name="Join Style">
        <Option value="Miter"/>
    </Feature>
    <Feature name="Join Style">
        <Option value="Miter"/>
    </Feature>
    <Feature name="Image">

/Trapping Setting>
```
401

WIDTH OF TRAP
    DEFAULT  0.25 POINT
    BLACK     0.5 POINT
    IMAGE     0.25 POINT
OUTSIDE APPEARANCE OF TRACK
    COUPLING STYLE * MITER, ROUND, BEVEL
    END STYLE * MITER, OVERLAP
IMAGE
    LAYOUT OF TRAP (CENTER, CHOKE, EXTINCTION, SPREAD)
    CHECK BOX
    ON:     TRAP OBJECT TO IMAGE
    ON:     TRAP IMAGE TO IMAGE
    OFF:    INTERNALLY TRAP IMAGE
    ON:     TRAP 1-BIT IMAGE
THRESHOLD VALUE OF TRAP
    PROCEDURE          10%
    BLACK               100%
    DENSITY OF BLACK   1.6
    SLIDE TRAP           70%
    SUBTRACTION OF TRAP  100%

402

MISREGISTRATION CORRECTING METHOD AND APPARATUS FOR USE IN IMAGE PROCESSING APPARATUS

BACKGROUND OF THE INVENTION

1. Field of the Invention

The present invention relates to a correcting method for correcting a misregistration which is used in an image processing apparatus.

2. Description of the Related Art

There are mainly two kinds of methods of misregistration correction (hereinbelow, called "trapping") for correcting a deviation of a printing position of each of colors of C, M, Y, and K in a color printer. One is a method of executing a trapping process to data of a vector format such as intermediate data formed from printer description language data (hereinbelow, called "PDL data") or PDF data. Data of a format such as PS (PostScript), PDF (Portable Document Format), or the like is included in the printer description language data.

The other is a method of executing the trapping process to a bit map (raster format) in which a rendering of the PDL data has been completed (Japanese Patent No. 02639518).

According to the trapping process of the vector format, a drawing object is increased on the basis of information of a neighboring/overlap relation of each drawing object or an addition (trapping object) or the like of a drawing object is performed. Therefore, various kinds of methods can be utilized when the trapping object for a width or a white gap is embedded and the advanced trapping process can be realized. However, an edge management of every drawing object, a management of the trapping object, and the like are necessary.

According to the trapping process of the raster format, a neighboring portion is calculated on the basis of colors of a target pixel and an adjacent pixel in a bit map and a pixel correction is made. However, a pixel correcting method is limited and various techniques are necessary to raise calculating precision of the neighboring portion.

Those two methods are selectively used in dependence on an ability of a printing apparatus such as memory storage amount of the printing apparatus or performance of a CPU, the presence or absence of an RIP (Raster Image Processor) server, or a use case.

SUMMARY OF THE INVENTION

Both the trapping processing method of the raster format and the trapping processing method of the vector format have such a problem that there is poor data when the trapping process is executed, a processing load is very large in dependence on the data, and a sufficient high print processing speed cannot be realized.

As poor data when the trapping process of the vector format is executed, data in which an overlap amount of drawing objects is large and an outline of the drawing object is complicated can be mentioned.

According to the trapping process, although it is necessary to calculate overlap edges between the drawing objects, the larger the overlap amount is, the number of edges to be calculated increases exponentially, and the more the outline becomes complicated, the more the processing load to calculate the overlap edges increases. Those reasons can be mentioned as such a typical example that the sufficient high print processing speed cannot be realized in the trapping process of the vector format.

As poor data when the trapping process of the raster format is executed, there is image data having a high resolution. Fundamentally, a comparison between the target pixel and the adjacent pixel in the trapping process of the raster format is repetitively executed to all pixels in a page. Therefore, in many cases, the processing load is large and the process is executed by using ASIC or the like. Further, the higher the print resolution of the printing apparatus is, the more the number of target pixels increases and the processing load further increases. Those reasons can be mentioned as such a typical example that the sufficient high print processing speed cannot be realized in the trapping process of the raster format.

In order to solve the problems discussed above, the present invention provides a misregistration correcting apparatus used in an image processing apparatus which stores drawing objects in a page, renders them to bit maps, and forms print data, the misregistration correcting apparatus comprising: a forming unit configured to form an edge list showing information of edges of one scan line from the stored drawing objects; an updating unit configured to update the edge list formed by the forming unit; and a converting unit configured to convert the formed edge list into a bit map of one scan line, wherein the updating unit comprises: a first edge list updating unit configured to update the formed edge list on the basis of setting information of a trapping based on characteristics of a printing apparatus and an edge list of a one-line preceding line of the one scan line; and a second edge list updating unit configured to update the edge list on the basis of the trapping setting information and a span showing an outline of the drawing object on the edge list.

Further features of the present invention will become apparent from the following description of exemplary embodiments with reference to the attached drawings.

BRIEF DESCRIPTION OF THE DRAWINGS

FIG. 4 is a diagram illustrating an example of trapping setting information 105.

DESCRIPTION OF THE EMBODIMENTS

Preferred embodiments of the present invention will now be described in detail in accordance with the accompanying drawings.

Figure 1:
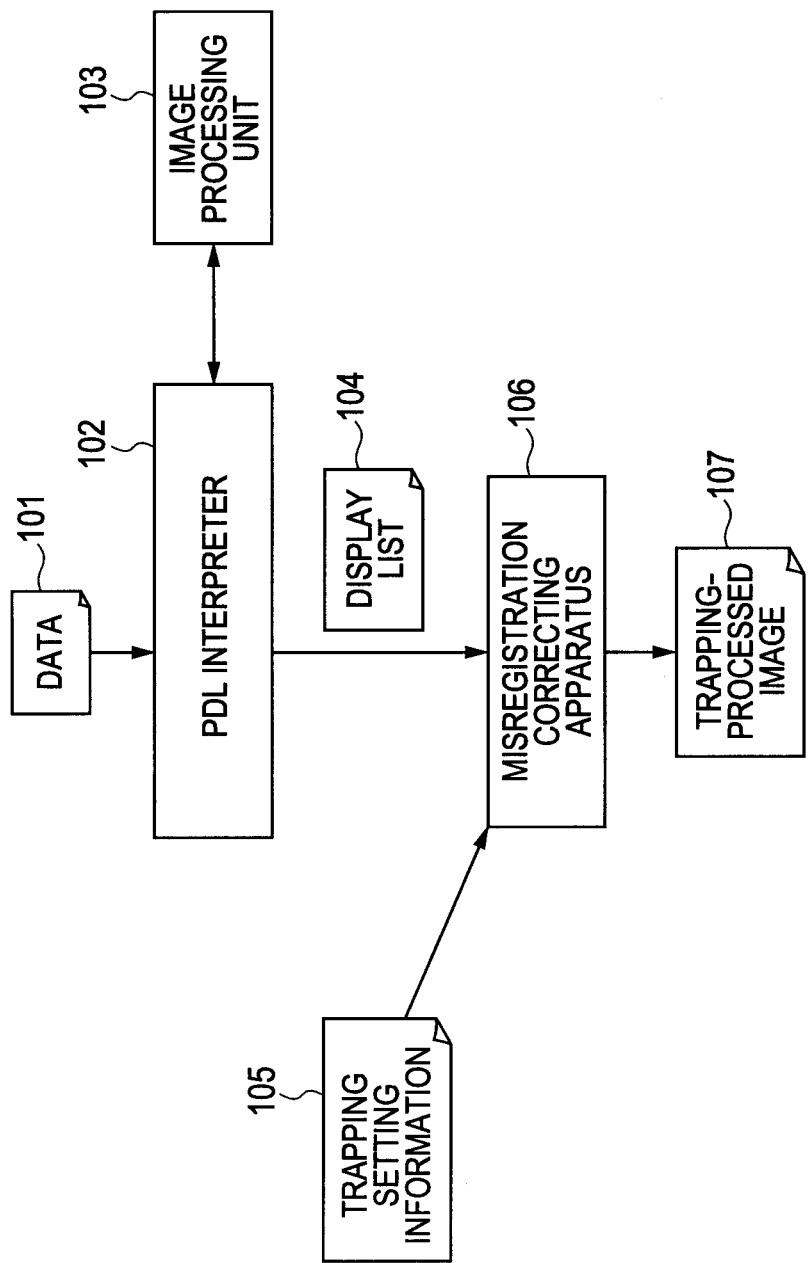
FIG. 1 is a constructional example of a rendering process to which a misregistration correcting apparatus of the invention is applied.

FIG. 1 illustrates a constructional example of a rendering process to which a misregistration correcting apparatus according to the embodiment is applied. When PDL data 101 is rendered, a PDL interpreter 102 converts the PDL data into a display list 104 as an intermediate expressing form of drawing data while performing a color conversion or the like in association with an image processing unit 103. Drawing objects held in the PDL data have been stored on the display list 104. In the embodiment, a misregistration correcting apparatus 106 forms a trapping-processed image 107 on the basis of the display list 104 and trapping setting information 105.

Figure 2:
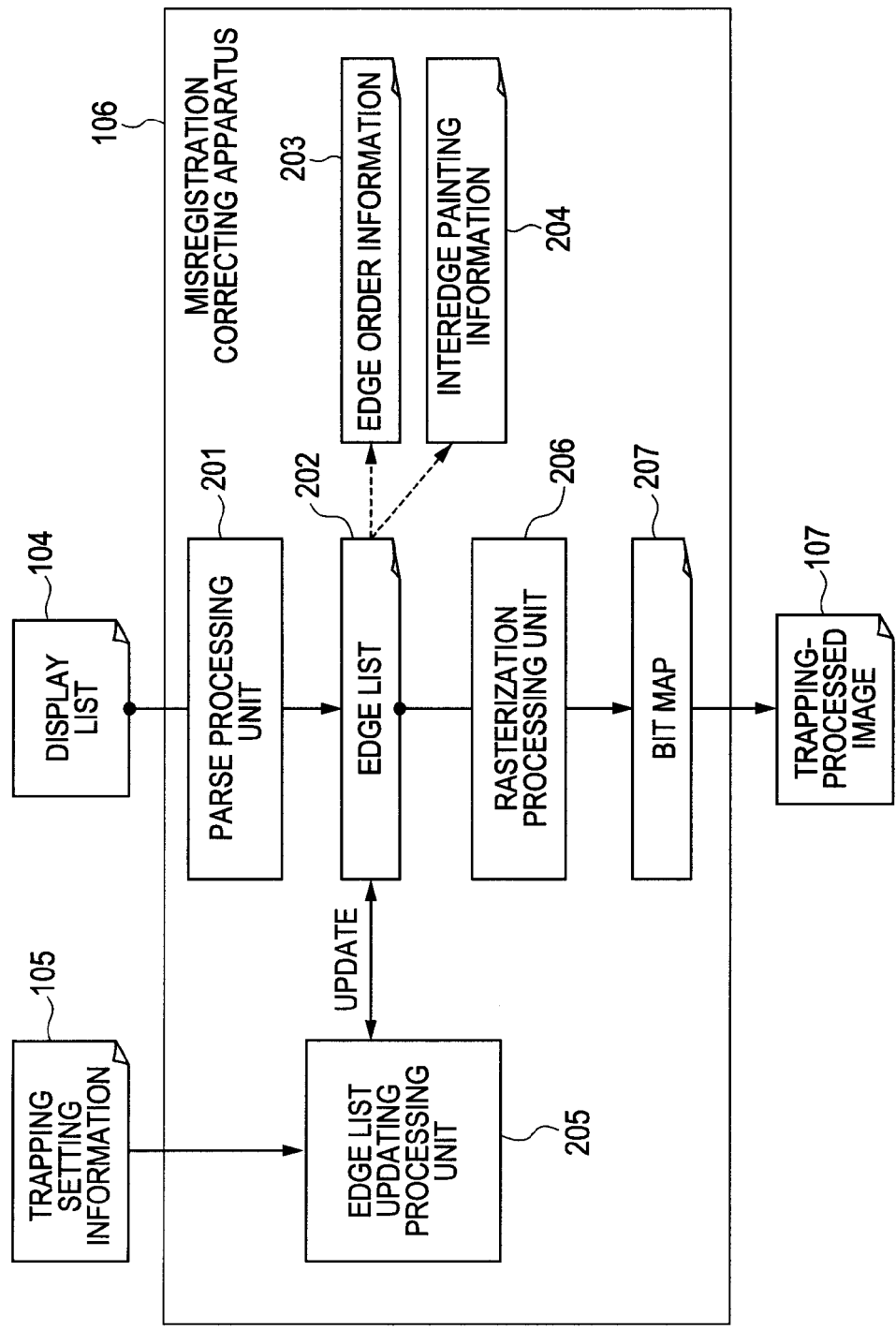
FIG. 2 is a constructional diagram of the misregistration correcting apparatus according to the invention.

FIG. 2 is a constructional diagram illustrating a constructional example of the misregistration correcting apparatus according to the embodiment.

The display list 104 is converted by a parse processing unit 201 into an edge list 202 showing X coordinates of the drawing objects existing on a scan line of a Y coordinate in a page. The "scan line" mentioned here denotes one line specified by the Y coordinate integer value of the page. The "edge list" denotes a list in which an outline of each drawing object existing on one line is expressed by a pair (hereinbelow, called "span") of a start point and an end point of the X coordinate. A specific example will be made hereinafter with reference to FIG. 5.

At the same time, the color of the drawing object is converted into interedge painting information 204 and, further, overlap information of the drawing object is converted into edge order information 203. The drawing object is expressed by a set of the edge list 202, edge order information 203, and interedge painting information 204. As a method of forming such a set, there is a method whereby a link is connected from the edge list 202 to the relevant edge order information 203 and interedge painting information 204 or both information 203 and 204 is added to the edge list 202. For simplicity of description, an explanation will be made on the assumption that the latter method whereby both information is included to the edge list is used. However, the former method may be also used.

An edge list updating processing unit 205 is a most characteristic unit in the misregistration correcting apparatus according to the embodiment. By using the trapping setting information 105, the edge list updating processing unit 205 updates the edge list 202 formed by the parse processing unit 201. Items to be updated here are mainly such a span addition of the trapping object as to correct the misregistration and an addition of the interedge painting information.

The edge list 202 updated by the edge list updating processing unit 205 is converted into a bit map 207 by a rasterization processing unit 206. The bit map 207 is obtained by rasterizing the edge list 202 which was updated by performing the addition or the like of the trapping object in the edge list updating processing unit 205, that is, it is a bit map to which the trapping process has been performed. By repetitively executing the above process every Y coordinate of the whole page, the trapping-processed image 107 as a product of the misregistration correcting apparatus 106 is formed.

Figure 3:
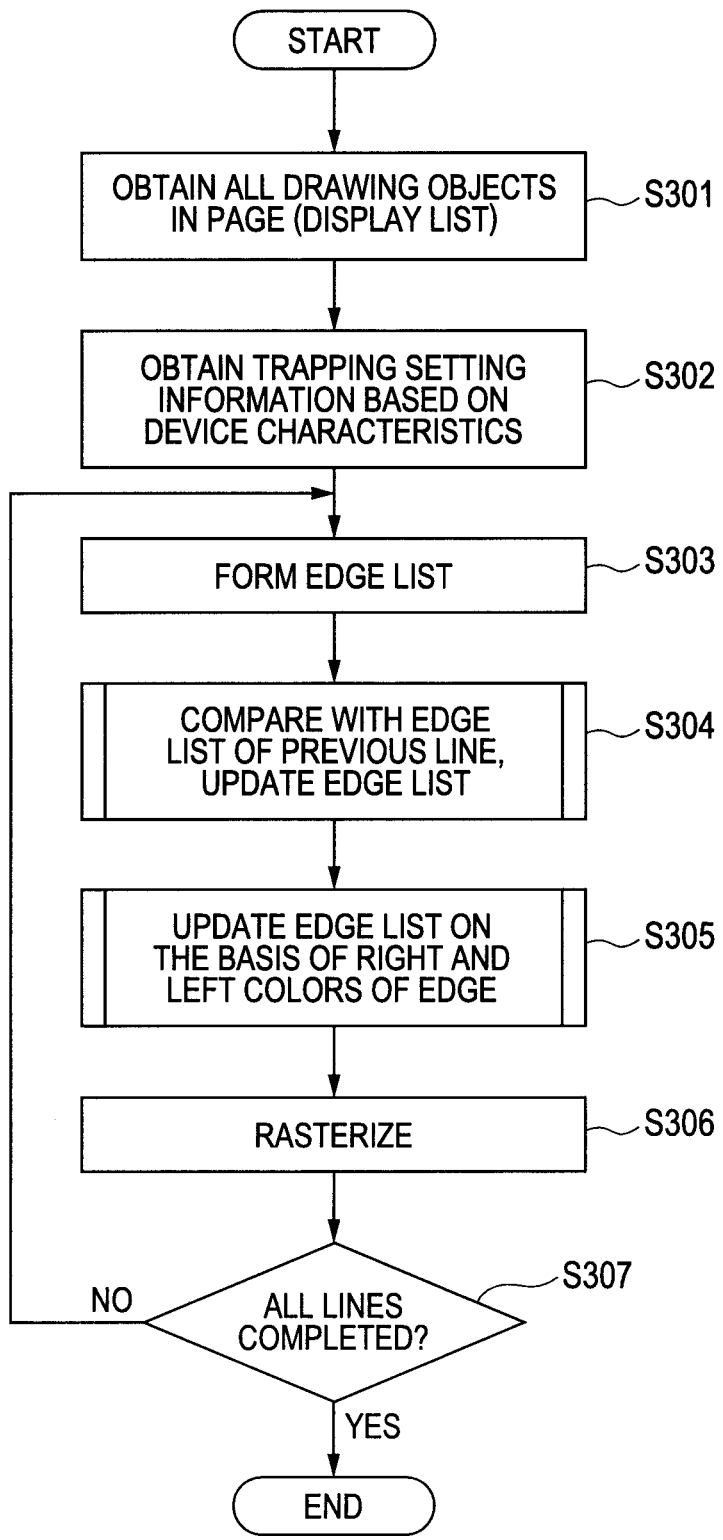
FIG. 3 is a flowchart illustrating a flow of a misregistration correcting process in the misregistration correcting apparatus.

FIG. 3 is a flowchart illustrating a flow of a misregistration correcting process in the misregistration correcting apparatus.

The misregistration correcting apparatus 106 obtains all drawing objects in the page by the display list 104 formed from the PDL data 101 by the PDL interpreter 102 (S301). The apparatus 106 also obtains the trapping setting information 105 formed based on device characteristics (S302). Although the trapping setting information 105 is information which has unconditionally been determined from the device or information which is formed by the user by using a print utility or the like, both of them can be equivalently handled in the embodiment. The device mentioned here is a printer engine 1202 serving as an image output device, which will be described hereinafter. The print utility is controlled, a test image of CMYK colors is formed by the printer engine 1202, the test image is measured by a spectrophotometric colorimetry apparatus or a scanner unit, which will be described hereinafter, and a CMYK misregistration amount is obtained, so that the device characteristics are obtained.

Subsequently, the parse processing unit 201 forms the edge list 202 based on all of the drawing objects stored on the display list 104 (S303). In this instance, the edge order information 203 and the interedge painting information 204 associated with the edge list 202 are also formed here.

When the parse processing unit 201 forms the edge list 202, the edge list updating processing unit 205 processes it as follows. That is, the edge list 202 is compared with the edge list of one-precedent scan line which has previously been stored, thereby confirming an increase/decrease in spans of both scan lines. The edge list 202 is updated by adding a span of the trapping object on the basis of increase/decrease information and the trapping setting information 105 (S304). Details will be described hereinafter with reference to FIGS. 6 and 7.

The edge list updating processing unit 205 further adds the span of the trapping object to the edge list 202 updated in S304 on the basis of right and left colors of each span and the trapping setting information 105, thereby updating the edge list 202 (S305). Details will be described hereinafter with reference to FIGS. 8 and 9.

When the edge list updating processing unit 205 finishes the updating of the edge list (S304, S305), the rasterization processing unit 206 processes as follows. That is, the edge list 202 is rasterized to the bit map of one scan line (S306). The process itself of the rasterization processing unit 206 is not limited to the misregistration correcting apparatus but is similar to the ordinary rasterizing process.

When the foregoing processes of S303 to S306 are executed to all scan lines in the page (S307), the process of the misregistration correcting apparatus is completed and the trapping-processed images 107 of the number corresponding to the pages are formed. Print data is formed based on those images.

FIG. 4 illustrates an example of the trapping setting information 105 in the embodiment.

The trapping setting information which is sent to the misregistration correcting apparatus 106 is formed as a preset value based on the misregistration information which is peculiar to the device or is formed by designating what kind of trapping process the user executes through a printer driver or the print utility.

An example in which values of the trapping setting information are shown as an XML file is illustrated in 401.

In the embodiment, a function is specified by "Feature name" and a value or setting is designated by "Option Value". An example of items which the user is made to select by the printer driver or print utility is illustrated in 402.

In this instance, a width and an outside appearance of the trap, a relation between one drawing object and another drawing object, a threshold value, and the like can be designated. The items selected here are stored in the XML file format 401 and sent as trapping setting information 105 to the misregistration correcting apparatus 106.

Figure 5:
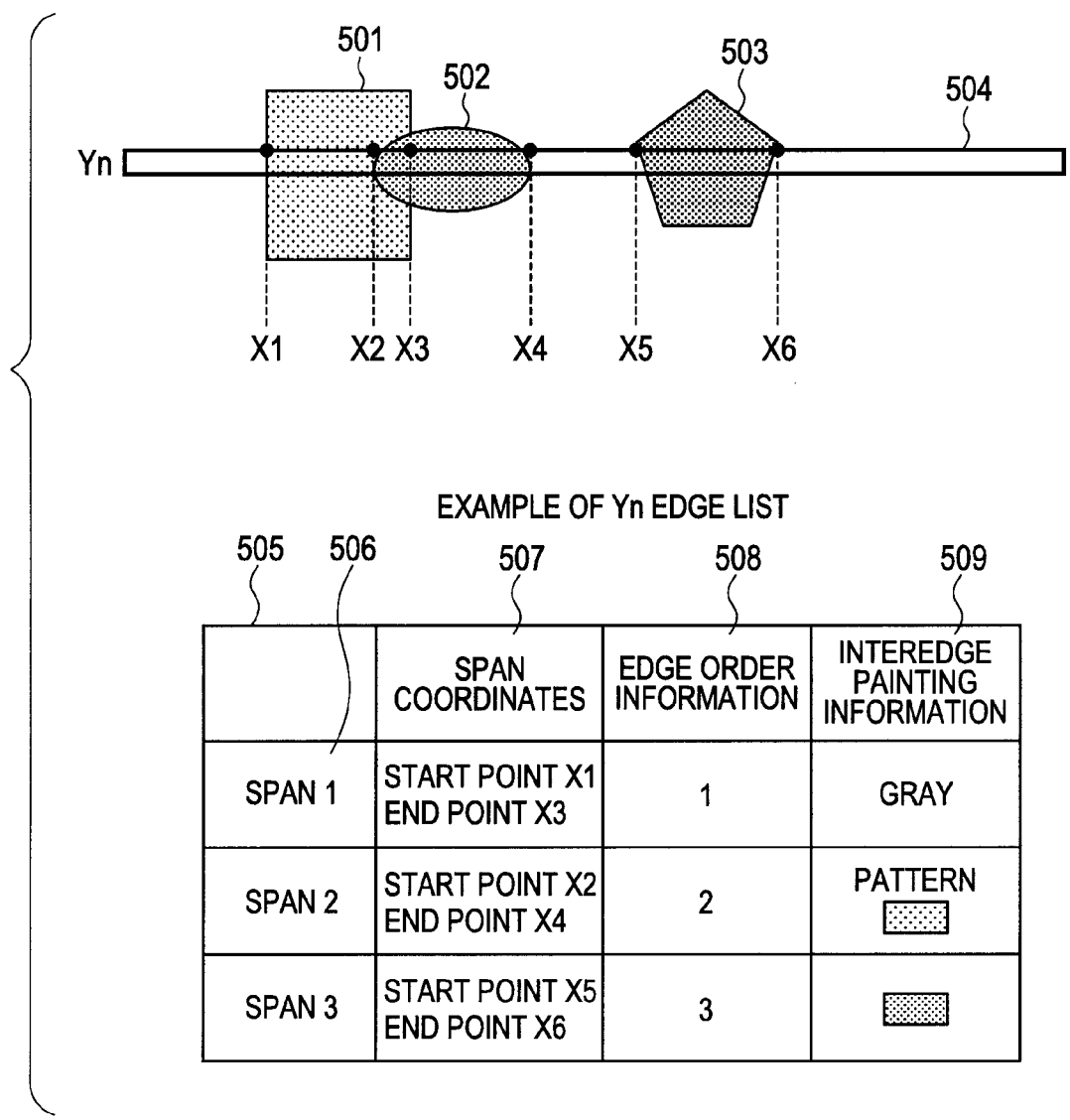
FIG. 5 is a diagram for specifically describing an example of an edge list.

FIG. 5 is a diagram for specifically describing an example of the edge list 202.

Drawing objects 501, 502, and 503 are arranged in the page. A scan line 504 of a Y coordinate Yn of a certain integer is illustrated. The edge list 202, edge order information 203, and interedge painting information 204 of the Y coordinate Yn are formed from the above information.

The parse processing unit 201 calculates X-coordinate intersection points X1 and X3 with the scan line of the Y coordinate Yn from outline information of the drawing object 501. Those X-coordinate values are stored in span coordinates 507 of a span 1 (506) showing a line segment of an edge list example 505 of Yn. Further, the parse processing unit 201 calculates interedge painting information showing color information between the X coordinates X1 and X3 from painting information of the drawing object 501 and stores RGB values of gray into interedge painting information 509. The parse processing unit 201 also calculates edge order information showing a layout order between the X coordinates X1 and X3 from a layout order of the drawing object 501 and stores information ("1" in this example) by which a vertical relation to a plurality of spans can be discriminated into edge order information 508. Details will be described hereinafter with reference to FIG. 9. Various kinds of information extracted from the drawing object 501 is used as information of the span 1.

Similarly, various kinds of information extracted from the drawing object 502 is used as information of a span 2. Various kinds of information extracted from the drawing object 503 is used as information of a span 3. The edge list is formed from information of each drawing object.

To such a drawing object that it does not overlap onto the scan line of the Y coordinate Yn, since no X-coordinate intersection point exists, the information is not stored in the edge list of the Y coordinate Yn.

Figure 6:
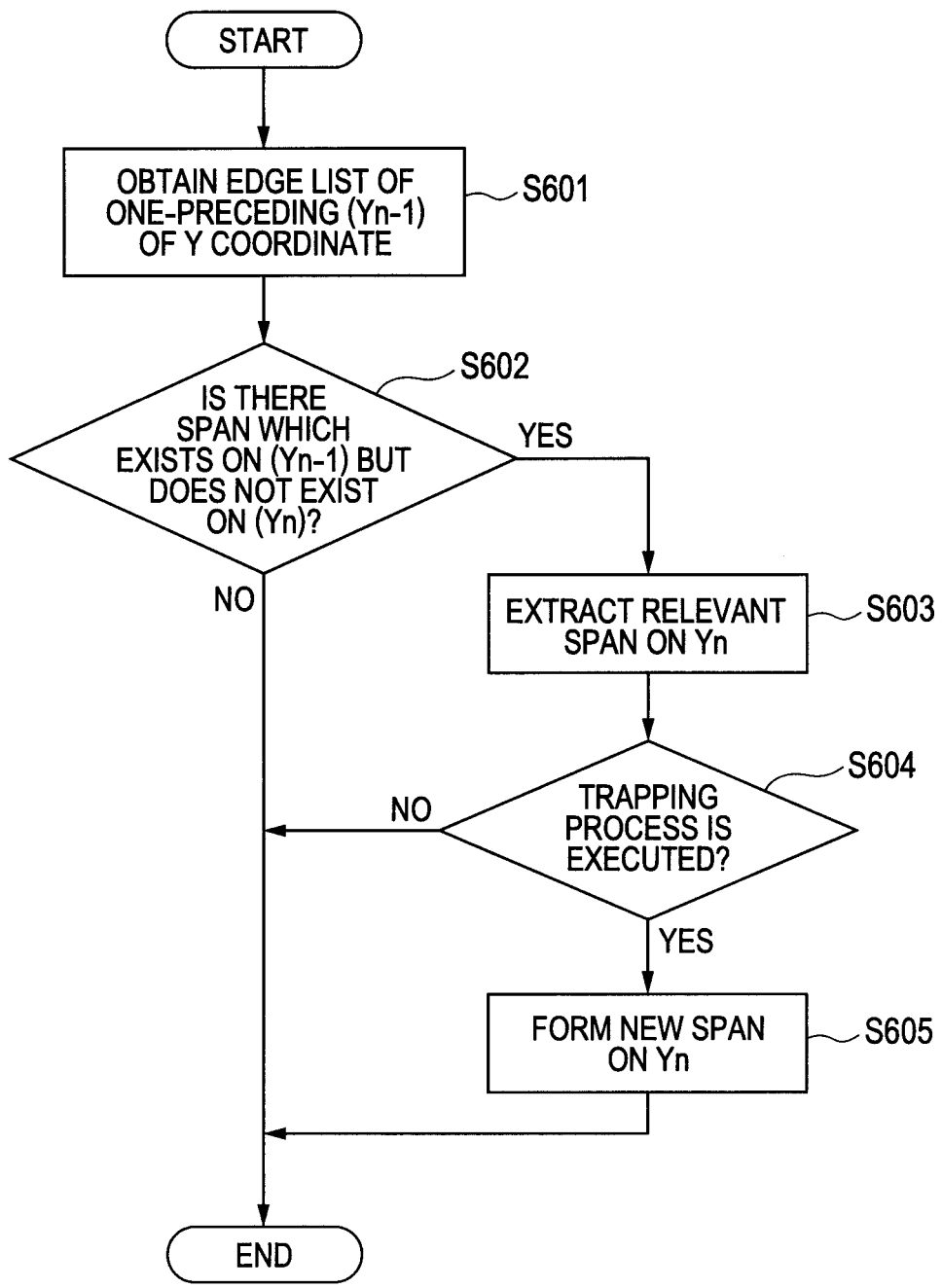
FIG. 6 is a flowchart illustrating a process of S304 in detail.

FIG. 6 is a flowchart illustrating a process of the edge list updating processing unit 205 showing details of S304 in FIG. 3.

When the parse processing unit 201 forms the edge list of the Y coordinate Yn (S303), it is sent to the edge list updating processing unit 205.

The edge list updating processing unit 205 obtains an edge list of one-line preceding Y coordinate (Yn−1) which has previously been stored (S601). Subsequently, whether or not there is a span which exists on the edge list of Yn−1 and does not exist on the edge list of Yn is discriminated (S602). Whether or not the relevant span exists can be discriminated on the basis of a coincidence of the edge order information 508 of the edge list, a coincidence of the interedge painting information 509, and a discrimination result about whether Or not a start point and an end point of the span coordinates 507 are close to a certain threshold value. Such a threshold value may be set to a few pixels as a fixed value or can be also designated as trapping setting information 105.

If there is the span which exists on Yn−1 and does not exist on Yn in S602, this means that a certain lower side of a certain drawing object is completed at Yn−1 and a different drawing object exists or the drawing object does not exist on Yn. It means that it may be necessary to execute the trapping process in such a span on Yn.

Subsequently, a span on Yn including the X coordinate of the relevant span on Yn−1 is extracted (S603). At this time, there are also a case where no drawing object exists in the span on Yn, a case where one drawing object exists, and a case where a plurality of drawing objects exist. A specific example of each of those cases will be described with reference to FIG. 7.

Subsequently, the edge list updating processing unit 205 extracts the interedge painting information of each span for the relevant span on Yn and discriminates whether or not the trapping process is executed to such a span (S604). Although the discrimination is made here based on the trapping setting information 105, the most fundamental discrimination is made in the following case: that is, a case where the interedge painting information of the span on Yn−1 is one or a plurality of Cyan, Magenta, Yellow, and Black and the interedge painting information of the span on Yn is constructed by colors different from those of the interedge painting information of the span on Yn−1. Such a discrimination can be also regarded as a fundamental discrimination of the trapping process and is not a characteristic part in the embodiment.

If the edge list updating processing unit 205 decides that the trapping process is executed to both of the spans on Yn and Yn−1, the span on Yn−1 is newly formed on the edge list of Yn (S605). As a method of setting the interedge painting information and the edge order information of the span which is added at that time and a method of updating the X coordinate of the span on Yn which has been determined so that the trapping process is executed, many variations can be performed based on the trapping setting information 105.

Thus, the edge list updating process (updating of the first edge list) of Yn based on Yn−1 which is executed by the edge list updating processing unit 205 is completed.

Figure 7:
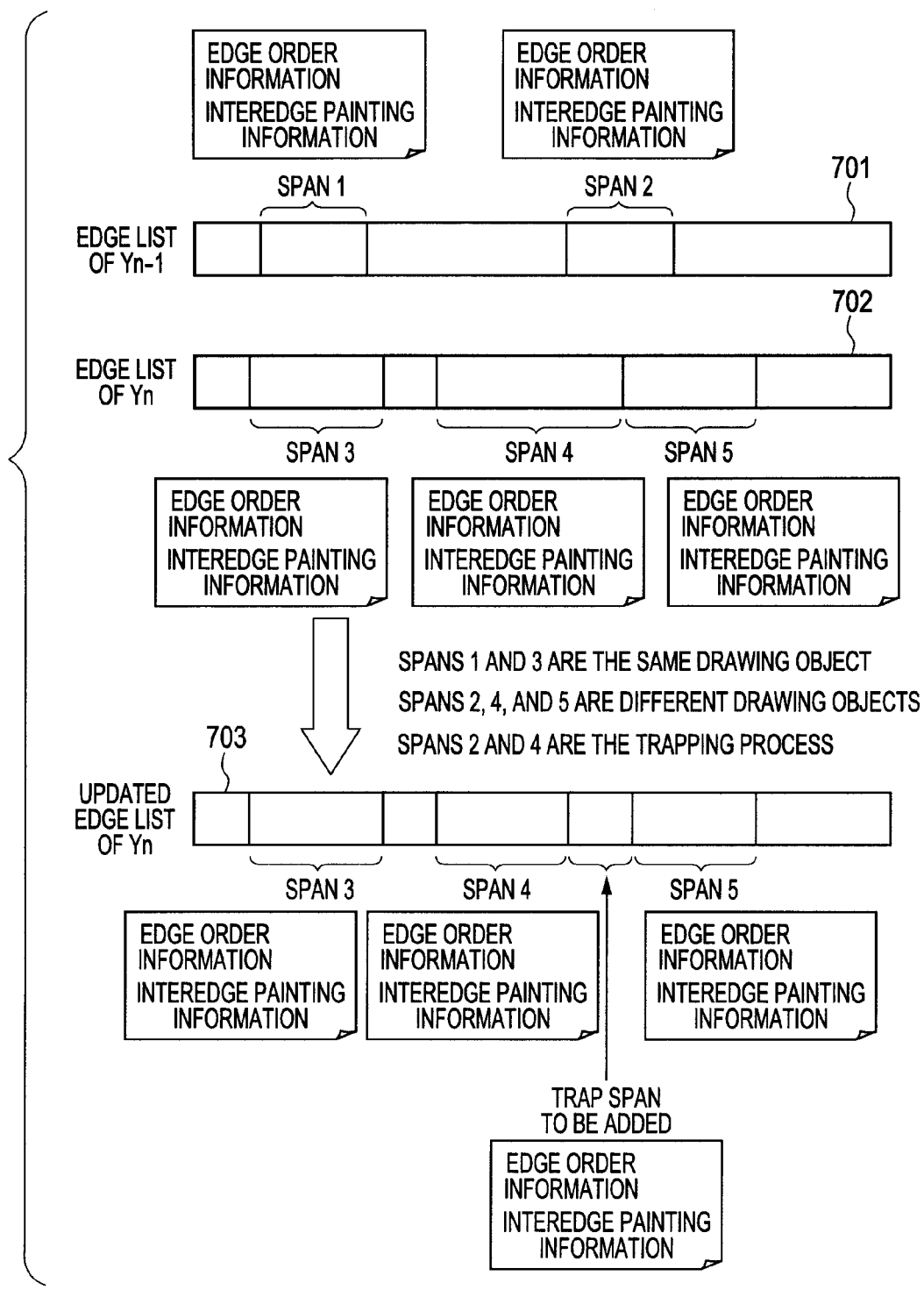
FIG. 7 is a diagram for describing the flowchart of FIG. 6 by using a specific example.

The flowchart of FIG. 6 will be described by using a specific example with reference to FIG. 7.

It is assumed that the spans 1 and 2 have been stored in an edge list 701 of Yn−1. Although the coordinates of those spans of the edge list example 505 are expressed here by being arranged on several straight lines in order to easily understand them, they are identical. It is assumed that the spans 3, 4, and 5 have been stored in an edge list 702 of Yn.

In the discrimination of S602 in FIG. 6, it is determined that the trapping process is not executed because a difference between the span coordinates of the span 1 on Yn−1 and the span 3 on Yn is equal to or less than a certain threshold value, their interedge painting information are identical, and their edge order information are identical. In the span 2 on Yn−1, nothing that can be regarded as a span similar to the span 2 exists on Yn. Therefore, in S603, the relevant span is extracted on Yn on the basis of the span coordinates of the span 2. The spans 4 and 5 are extracted here. Whether or not the trapping process of S604 is executed in each of the spans 2 and 4 or each of the spans 2 and 5 is discriminated. It is assumed here that the interedge painting information of the span 2 is Cyan and the interedge painting information of the span 4 is Magenta. This means that since Cyan and Magenta are different colors (no common color exists), a misregistration occurs, and they become targets of the trapping process. In a process of S605, an end point of the span coordinates of the span 4 on Yn is updated to a start point of the span coordinates of the span 2. A trapping span in which a start point of the span coordinates is the start point of the span coordinates of the span 2 and an end point of the span coordinates is the end point of the span coordinates of the span 4 before the updating is added onto Yn. It is assumed that the edge order information of the trapping span has the same value as that of the edge order information of the span 4 and the interedge painting information of the trapping span has a color in which Cyan of the span 2 and Magenta of the span 4 are synthesized. Thus, a white gap between the spans 2 and 4 can be prevented.

Now, assuming that the interedge painting information of the span 2 is Cyan and the interedge painting information of the span 5 is Blue, since the Cyan component exists in both of them, the trapping process in the spans 2 and 5 is not executed. In this case, the edge list of Yn is not updated. Consequently, the updated edge list of Yn becomes as shown in 703.

Figure 8:
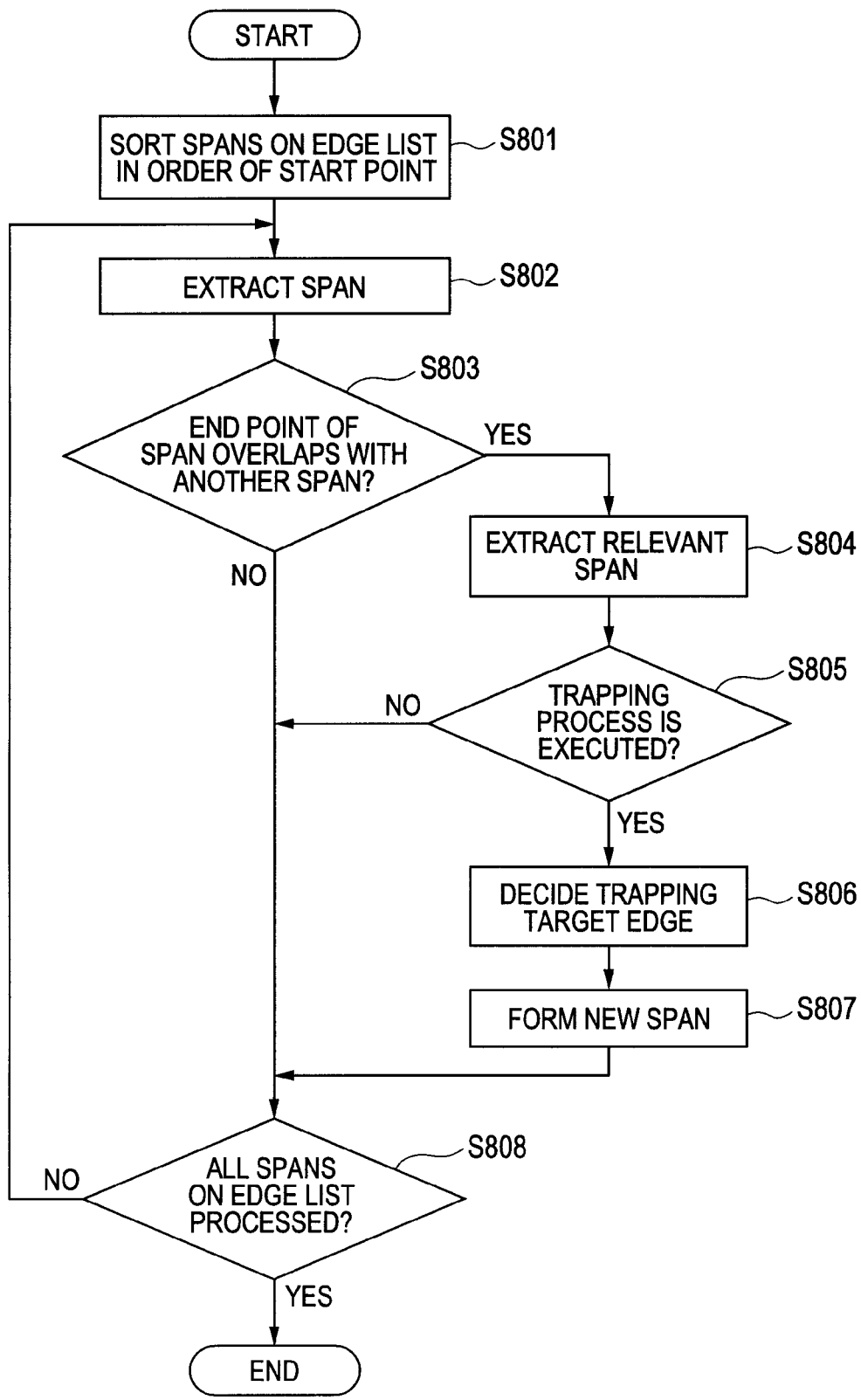
FIG. 8 is a flowchart illustrating a process of S303 in detail.

FIG. 8 is a flowchart illustrating a process of the edge list updating processing unit 205 showing details of S305 in FIG. 3.

After the edge list updating processing unit 205 updated the edge list of Yn on the basis of the edge list of the Y coordinate Yn−1 (S304), this flowchart is started.

The edge list updating processing unit 205 sorts all of the spans stored on the edge list in order of the start point (S801). Subsequently, the spans are extracted in sorting order (S802). Then, whether or not the end point of the extracted span is in contact with or overlaps with another span is discriminated (S803). If it is in contact with or overlaps with another span, the overlapped span is extracted (S804). The color of the interedge painting information of both spans is extracted and whether or not the trapping process is executed is discriminated (S805) in a manner similar to S604. If it is determined that the trapping process is executed, a trapping target edge is extracted on the basis of the vertical relation between both spans and the start points and end points of the span coordinates (S806). A specific example of the trapping target edge will be described hereinafter. A new span is formed by using the specified trapping target edge as a base point (S807). With respect to the creation of the new span, the span coordinates and the interedge painting information are set based on the trapping setting information 105. With respect to the interedge painting information, such order information as to overwrite both of the above spans is designated.

The above process is executed to all of the spans stored on the edge list of the Y coordinate Yn (S808). The edge list updating process in the X direction is completed. (Updating of the second edge list)

Figure 9:
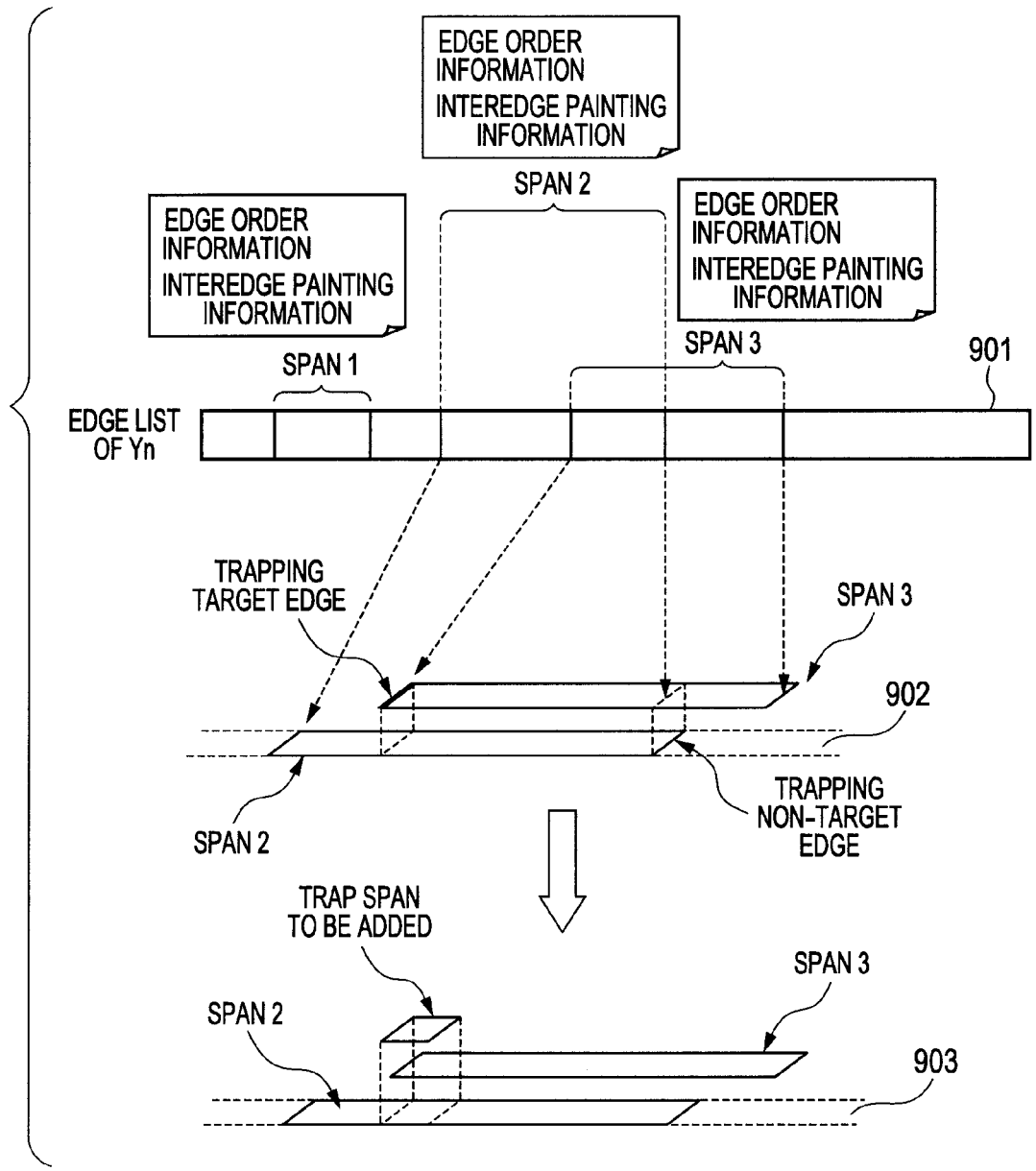
FIG. 9 is a diagram for describing the flowchart of FIG. 8 by using a specific example.

The flowchart of FIG. 8 will be specifically described with reference to FIG. 9.

It is assumed that the spans 1, 2, and 3 have been stored on an edge list 901 of Yn. Although the span coordinates of the edge list example 505 are expressed here by being arranged on several straight lines in order to easily understand them, they are identical. Further, the spans 2 and 3 overlap. A state where the spans 2 and 3 overlap is illustrated in 902. As illustrated in 508 in FIG. 5, the edge order information 508 has been stored in each span. For example, if the edge order information of the span 2 is equal to 1 and the edge order information of the span 3 is equal to 2, this means that the span 3 overlaps with the span 2 and the state 902 as illustrated in the diagram is obtained.

The process for sorting in order of the start point in S801 in FIG. 8 is substantially the same as a state where the span coordinates are arranged on the edge list 901. In S802, the span 1 of the smallest start point is selected. Since the end point of the span 1 is not in contact with and does not overlap with another span, the trapping process is not executed to the span 1. Subsequently, in S802, the span 2 of the second smallest start point is selected. Since the end point of the span 2 overlaps with the span 3, the span 3 is selected in S804. Whether or not the trapping process is executed is discriminated on the basis of the interedge painting information of both of the spans 2 and 3 in S805 in a manner similar to S604. If the trapping process is executed, the trapping target edge is calculated based on the vertical relation between the spans as shown in 902. In this case, the end point of the span 3 which overlaps with the span 2 becomes the trapping target edge. Since the end point of the span 2 is hidden by the span 3, it becomes the trapping target edge. In S807, the trapping span of the width of the trapping setting information around the trapping target edge as a center is added to the edge list. At this time, assuming that the coordinate of the trapping target edge is equal to X and its width is equal to W, the start point of the trapping span is equal to X−½ W and its end point is equal to X+½ W. The interedge painting information of the trapping span is fundamentally equal to the color in which the interedge painting information of the spans 2 and 3 are synthesized. As edge order information of the trapping span, a value such as 3 which means that it is over the span 3 is set.

In this manner, the trapping span is added to the edge list and updated.

Figure 10:
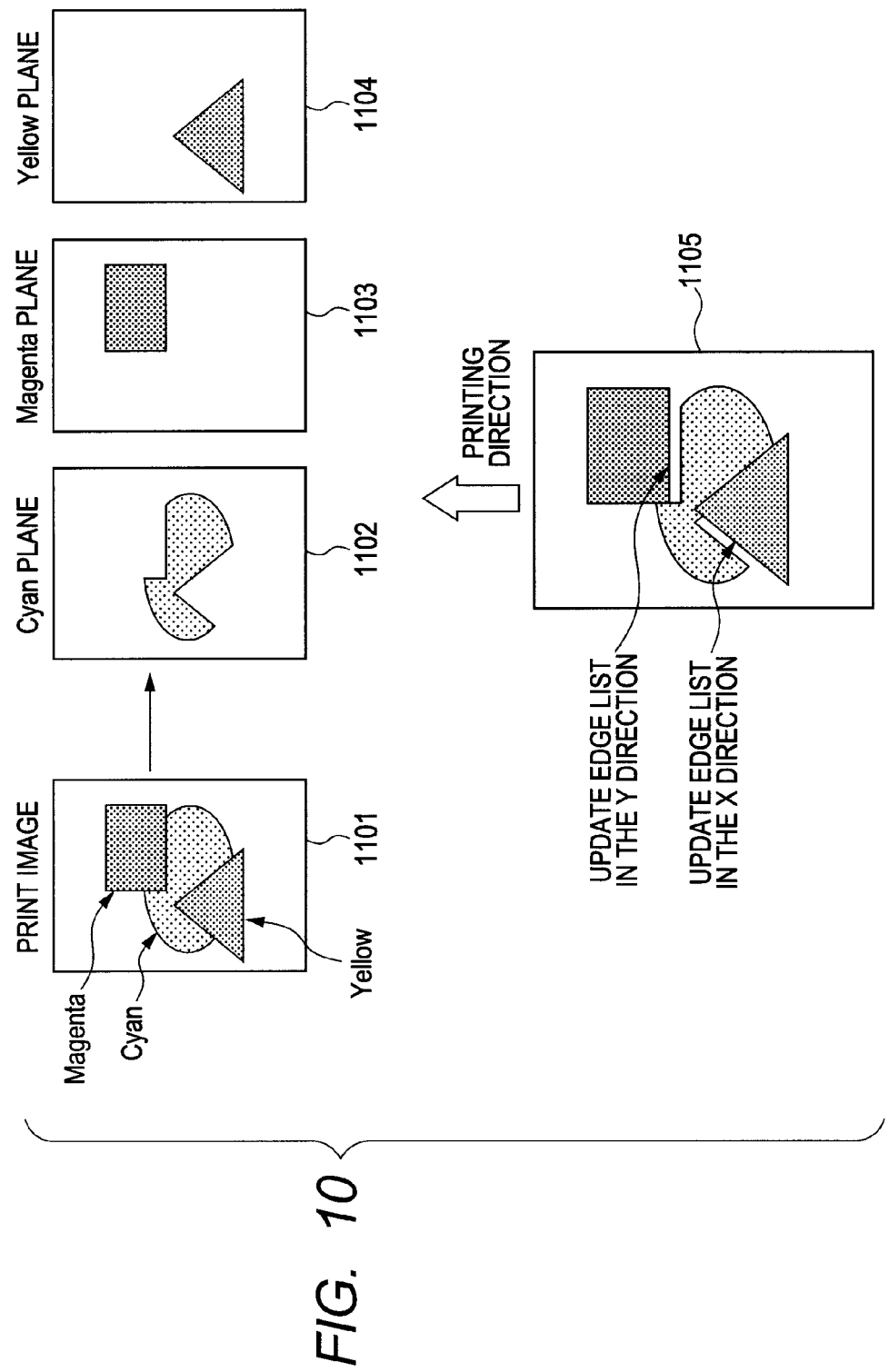
FIG. 10 is a diagram illustrating an example in which a white gap is reduced according to the invention.

FIG. 10 is a diagram illustrating in which position, the white gap is embedded by the trapping span in the Y direction added in FIG. 6 and the trapping span in the X direction added in FIG. 8. An image 1001 to be printed is illustrated. A drawing object whose color is Cyan, a drawing object whose color is Magenta, and a drawing object whose color is Yellow exist. Since the images are formed every color of toner, they are expressed as a Cyan plane 1002, a Magenta plane 1003, and a Yellow plane 1004. An example in which the printing direction adapted to feed a sheet is the vertical direction is illustrated in 1005. At this time, a horizontal white gap is liable to occur. The white gap in the horizontal direction is reduced by updating the edge list in the Y direction in S304 in FIG. 3. The white gap in the oblique direction is reduced by updating the edge list in the X direction in S305 in FIG. 3.

<Construction of Apparatus Suitable for Misregistration Correcting Apparatus>

Figure 11:
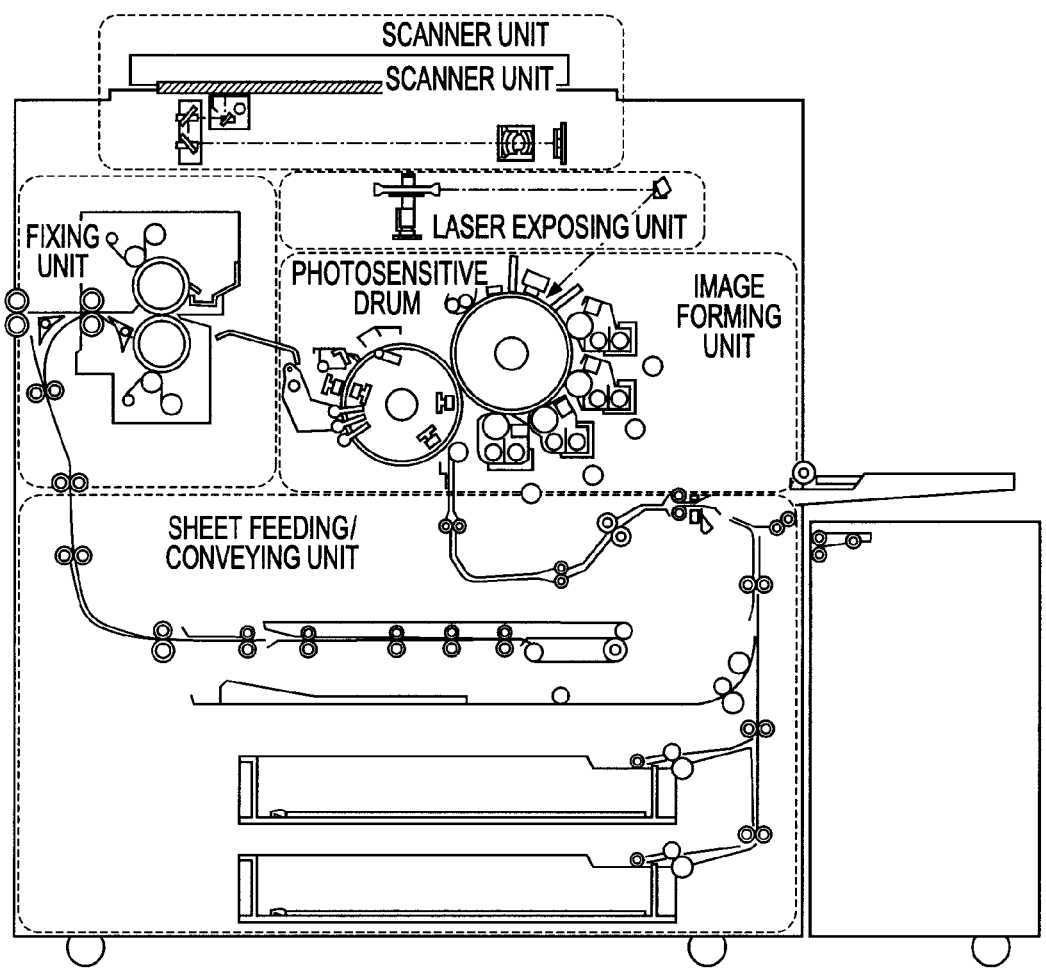
FIG. 11 is a diagram for describing a construction of an MFP which is suitable to apply the misregistration correcting apparatus.

A construction of an MFP (Multi Function Printer) serving as an image processing apparatus suitable to apply the misregistration correcting apparatus in the embodiment mentioned above will be described with reference to FIG. 11.

A color system MFP is constructed by a scanner unit, a laser exposing unit, a photosensitive drum, an image forming unit, a fixing unit, a sheet feeding/conveying unit, and a printer control unit (not shown) for controlling those units. Unlike FIG. 1, the MFP includes the PDL interpreter 102 and the image processing unit 103 in addition to the construction of the misregistration correcting apparatus in FIG. 1.

In the scanner unit, light is irradiated to an original put on a sheet table, an image on the original is optically read, and the read image is converted into an electric signal, thereby forming image data.

In the laser exposing unit, a light beam such as a laser beam or the like modulated according to the image data is input to a rotary polygon mirror which rotates at a constant angular velocity and is irradiated as reflection scanning light to the photosensitive drum.

In the image forming unit, the photosensitive drum is rotated and is charged by a charging device, a latent image formed on the photosensitive drum by the laser exposing unit is developed by the toner, and the toner image is transferred onto the sheet. A small amount of toner remaining on the photosensitive drum without being transferred at this time is collected. Such a series of electrophotographic processes as mentioned above is executed, thereby forming an image. At this time, the foregoing electrophotographic processes are sequentially repetitively executed alternately by developing units (developing stations) having toner of magenta (M), cyan (C), yellow (Y), and black (K) for a period of time during which the sheet is wrapped at a predetermined position of a transfer belt and is rotated four times. After completion of the rotation of four times, the sheet on which the full color toner images of four colors have been transferred is separated from the transfer drum and conveyed to the fixing unit.

The fixing unit is constructed by a combination of rollers and belts and a heat source such as a halogen heater or the like is built in the fixing unit. The toner on the sheet to which the toner images have been transferred by the image forming unit is melted and fixed by a heat and a pressure.

The sheet feeding/conveying unit has one or more sheet containers represented by sheet cassettes or paper decks, separates a plurality of sheets enclosed in the sheet container one by one in response to an instruction of the printer control unit, and conveys each sheet to the image forming unit and the fixing unit. The sheet is wound around the transfer drum of the image forming unit. After the sheet was rotated four times, it is conveyed to the fixing unit. While the sheet is rotated four times, the toner images of the YMCK colors are transferred onto the sheet. In the case of forming images onto both surfaces of the sheet, control is made so that the sheet which passed through the fixing unit passes through a conveying path for conveying it to the image forming unit again.

The printer control unit communicates with an MFP control unit for controlling the whole MFP and executes control in response to its instructions. While managing a state of each of the scanner unit, laser exposing unit, image forming unit, fixing unit, and sheet feeding/conveying unit, the printer control unit instructs so that all of them can harmoniously smoothly operate.

Figure 12:
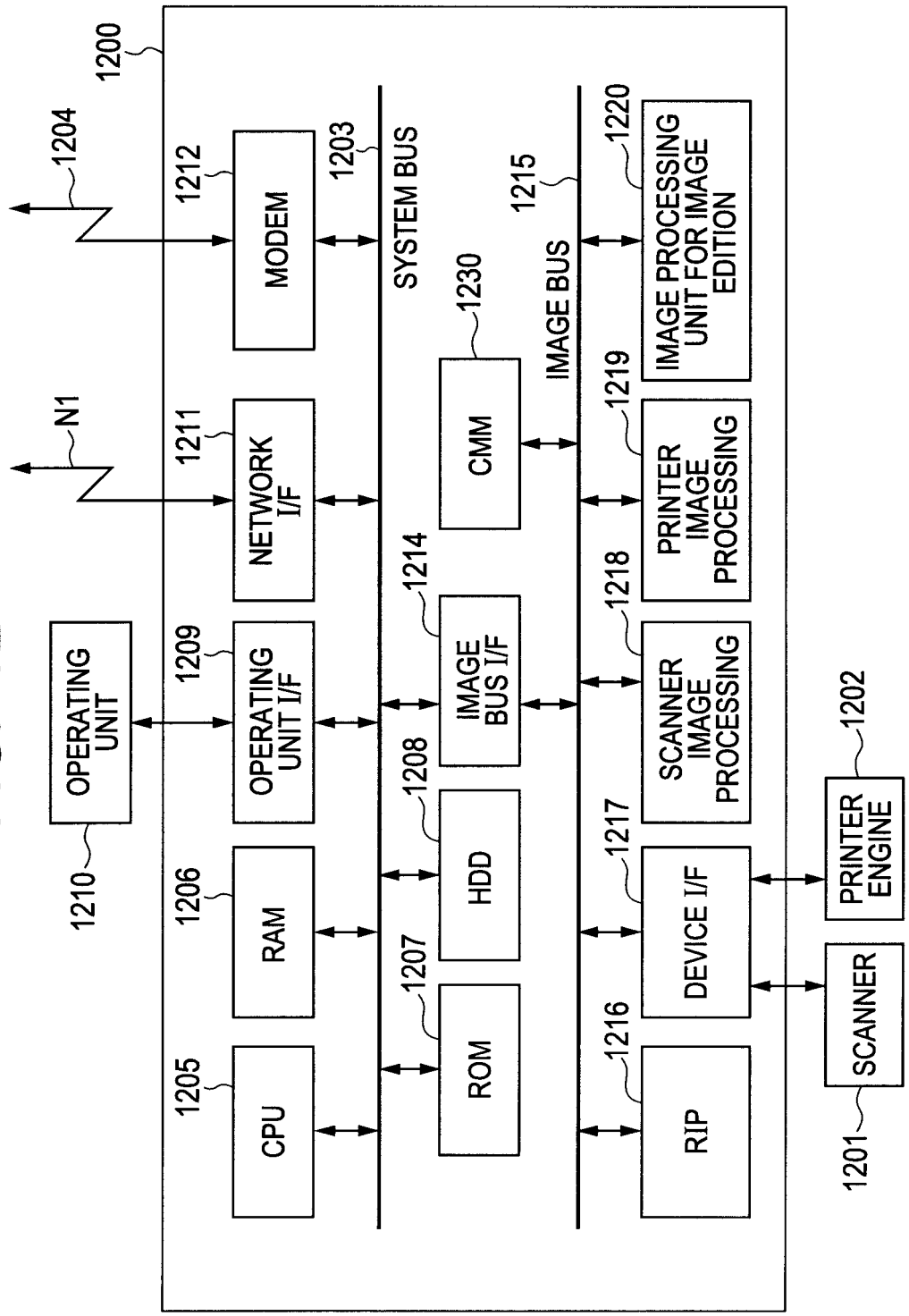
FIG. 12 is a diagram illustrating a construction of a control unit which is suitable to apply the invention.

FIG. 12 is a block diagram illustrating a constructional example of a control unit (controller) of the MFP in the embodiment. In FIG. 12, a control unit 1200 is connected to a scanner 1201 serving as an image input device and the printer engine 1202 serving as an image output device and makes control for reading the image data and outputting a print image. The control unit 1200 is also connected to a LAN N1 or a public line 1204, thereby making control for inputting/outputting image information and device information through the LAN N1.

A CPU 1205 is a central processing unit for controlling the whole MFP. A RAM 1206 is a system work memory for making the CPU 1205 operative and is also an image memory for temporarily storing the input image data. Further, a ROM 1207 is a boot ROM in which a boot program of the system has been stored. An HDD 1208 is a hard disk drive for storing system software for various kinds of processes, the input image data, and the like.

An operating unit I/F 1209 is an interface unit for an operating unit 1210 having a display screen which can display the image data and the like. The I/F 1209 outputs operation display screen data to the operating unit 1210. The operating unit I/F 1209 plays a role of transferring the information input by the operator to the CPU 1205. A network interface 1211 is realized by, for example, a LAN card or the like, is connected to the LAN N1, and inputs/outputs information to/from an external apparatus. Furthermore, a modem 1212 is connected to the public line 1204 and inputs/outputs the information to/from the external apparatus. The foregoing units are arranged on a system bus 1213.

An image bus I/F 1214 is an interface for connecting the system bus 1213 to an image bus 1215 for transferring the image data at a high speed. The image bus I/F 1214 is also a bus bridge for converting a data structure. A raster image processor (RIP) 1216, a device I/F 1217, a scanner image processing unit 1218, a printer image processing unit 1219, an image processing unit 1220 for image edition, and a color management module (CMM) 1230 are connected to the image bus 1215.

The raster image processor (RIP) 1216 develops a page description language (PDL data) code and vector data into images. The raster image processor (RIP) 1216 corresponds to the PDL interpreter 102 and the misregistration correcting apparatus. The scanner 1201, printer engine 1202, and control unit 1200 are connected to the device I/F 1217. The device I/F unit 1217 performs a conversion of a synchronous system/asynchronous system of the image data.

The scanner image processing unit 1218 executes various kinds of processes such as correction, modification, edition, and the like to the image data which was input from the scanner 1201. The printer image processing unit 1219 executes various kinds of processes such as correction, resolution conversion, and the like according to the printer engine to the image data which is print-output. The image processing unit 1220 for image edition executes various kinds of processes such as rotation of the image data, compressing/decompressing process of the image data, and the like. The CMM 1230 is a dedicated hardware module for executing a color converting process (also referred to as a color space converting process) based on a profile and calibration data to the image data. The profile is information like a function for converting the color image data expressed by a color space which depends on the apparatus into a color space (for example, Lab or the like) which does not depend on the apparatus. The calibration data is data for correcting color reproducing characteristics of the scanner 1201 and the printer engine 1202 in a color hybrid apparatus. The image processing unit 103 in FIG. 1 corresponds to the units 1219 and 1220 and the CMM 1230.

By the above construction, the misregistration correction is performed merely by locally adding the trapping object (trapping span) to the edge list just before locally converting into a bit map. Therefore, the process can be executed at a high speed by a memory of a capacity smaller than that in the trapping method in the related art. At the same time, since the trapping target edge can be locally specified, the execution of the wasteful trapping can be avoided and the misregistration correction of high quality can be realized.

Other Embodiments

The processes of the embodiments described above can be realized also by software (program). Namely, the program for realizing the functions of the embodiments is supplied to a system or an apparatus through a network or various kinds of storage media and a computer (or a CPU, MPU, or the like) of the system or apparatus reads out the program and executes the processes based on the program. Such program or a storage medium that stores the program is construed to form an embodiment of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146575, filed Jun. 28, 2010, which is hereby incorporated by reference herein in its entirety.

What is claimed is:

1. An image processing apparatus comprising:
    a generating unit configured to generate, for a target scan line and a previous scan line, spans of drawing objects included in a page, wherein the target scan line extends along an X-direction, and wherein the previous scan line is adjacent to the target scan line in a Y-direction; and
    an adding unit configured to execute, based on the spans of the drawing objects for the target scan line and the previous scan line, a trapping process for adding a span of a trapping object to the target scan line,
    wherein the adding unit comprises:
        a first unit configured to determine, based on painting information and coordinates information corresponding to the spans of the drawing objects generated for the target scan line and the previous scan line by the generation unit, whether or not a span of a trapping object should be added to the target scan line, and add a span of a trapping object to the target scan line when it is determined that a span of a trapping object should be added to the target scan line; and a second unit configured to determine, based on painting information and coordinates information corresponding to the spans of the drawing objects arranged in the X-direction with no gap for the target scan line, whether or not a span of a trapping object should be added to the target scan line, and add a span of a trapping object to the target scan line when it is determined that a span of a trapping object should be added to the target scan line.

2. The image processing apparatus according to claim 1, wherein the span of the trapping object added by the first unit has a mixed color of colors of the span on the previous scan line and the span on the target scan line corresponding the span on the previous scan line.

3. The image processing apparatus according to claim 1, wherein the second unit adds the span of the trapping object to the target scan line at a position corresponding to a starting position of one of the spans on the target scan line having the overlap, the one span being overlaid on the other of the spans.

4. The image processing apparatus according to claim 1, wherein the span of the trapping object added by the second unit has a mixed color of colors of the spans on the target scan line having the overlap.

5. The image processing apparatus according to claim 1, further comprising a rasterizing unit configured to execute a rasterizing process for the target scan line on a basis of the spans on the target scan line obtained after the adding unit executes the trapping process for adding the span trapping object.

6. The image processing apparatus according to claim 5, wherein the trapping process of adding the span trapping object by the adding unit and the rasterizing process by the rasterizing unit are executed alternately for the target scan line included in the page.

7. An image processing method performed by a computer, comprising:

generating, for a target scan line and a previous scan line, spans of drawing objects included in a page, wherein the target scan line extends along an X-direction, and wherein the previous scan line is adjacent to the target scan line in a Y-direction; and executing, based on the spans of the drawing objects for the target scan line and the previous scan line, a trapping process for adding a span of a trapping object to the target scan line, wherein the executing comprises:

a first determining step to determine, based on painting information and coordinates information corresponding to the spans of the drawing objects generated for the target scan line and the previous scan line, whether or not a span of a trapping object should be added;

adding a span of a trapping object to the target scan line when it is determined in the first determining step that a span of a trapping object should be added to the target scan line; and a second determining step to determine, based on painting information and coordinates information corresponding to the spans of the drawing objects arranged in the X-direction with no gap for the target scan line, whether or not a span of a trapping object should be added to the target scan line; and adding a span of a trapping object to the target scan line when it is determined in the second determining step that a span of a trapping object should be added to the target scan line.

8. A non-transitory computer readable storage medium storing a computer program for causing a computer to execute an image processing method comprising:

generating, for a target scan line and a previous scan line, spans of drawing objects included in a page, wherein the target scan line extends along an X-direction, and wherein the previous scan line is adjacent to the target scan line in a Y-direction; and executing, based on the spans of the drawing objects for the target scan line and the previous scan line, a trapping process for adding a span of a trapping object to the target scan line, wherein the executing comprises:

a first determining step to determine, based on painting information and coordinates information corresponding to the spans of the drawing objects generated for the target scan line and the previous scan line, whether or not a span of a trapping object should be added;

adding a span of a trapping object to the target scan line when it is determined in the first determining step that a span of a trapping object should be added to the target scan line; and a second determining step to determine, based on painting information and coordinates information corresponding to the spans of the drawing objects arranged in the X-direction with no gap for the target scan line, whether or not a span of a trapping object should be added to the target scan line; and adding a span of a trapping object to the target scan line when it is determined in the second determining step that a span of a trapping object should be added to the target scan line.

* * * * *